United States Patent [19]

Kispert et al.

[11] Patent Number: 4,884,902
[45] Date of Patent: Dec. 5, 1989

[54] ROLLER BEARING EXECUTING SWIVEL MOTIONS WITH DEVICE FOR THE SYNCHRONOUS GUIDANCE OF THE BEARING CAGE

[75] Inventors: Klaus Kispert; Robert Stolz, both of Schweinfurt, Fed. Rep. of Germany

[73] Assignee: SKF GmbH, Schweinfurt, Fed. Rep. of Germany

[21] Appl. No.: 263,617

[22] Filed: Oct. 27, 1988

[30] Foreign Application Priority Data

Nov. 4, 1987 [DE] Fed. Rep. of Germany ....... 3737386

[51] Int. Cl.[4] .................. F16C 19/50; F16C 32/00; F01B 13/04
[52] U.S. Cl. .................................. 384/550; 91/505; 92/12.2; 384/2
[58] Field of Search .................. 384/2, 154–156, 384/445, 451, 548, 550, 572–580, 625; 91/503–506; 92/12.2

[56] References Cited

U.S. PATENT DOCUMENTS

| 3,396,670 | 8/1968 | Baits | 91/506 |
| 4,029,367 | 6/1977 | Schwede et al. | 384/2 |
| 4,584,926 | 4/1986 | Beck, Jr. et al. | 91/505 X |
| 4,618,271 | 10/1986 | Li | 384/550 X |
| 4,627,330 | 12/1986 | Beck, Jr. | 384/576 X |

FOREIGN PATENT DOCUMENTS

| 2730408 | 1/1979 | Fed. Rep. of Germany | 384/584 |
| 3442391 | 1/1986 | Fed. Rep. of Germany | 92/12.2 |
| 3610914 | 1/1987 | Fed. Rep. of Germany | 91/505 |

*Primary Examiner*—Thomas R. Hannon
*Attorney, Agent, or Firm*—Rosen, Dainow & Jacobs

[57] ABSTRACT

The invention concerns a roller bearing for performing swivel motions including a mechanism for synchronously guiding the roller bearing cage, including a roller bearing cage having a journal with a rotatable pinion gear flexibly and elastically mounted thereon in the direction of the circumference of the cage by a cross-piece, the pinion gear having teeth which mesh with at least one set of teeth on the bearing parts of the roller bearing. Stops are provided to limit the motion of the pinion gear.

5 Claims, 2 Drawing Sheets

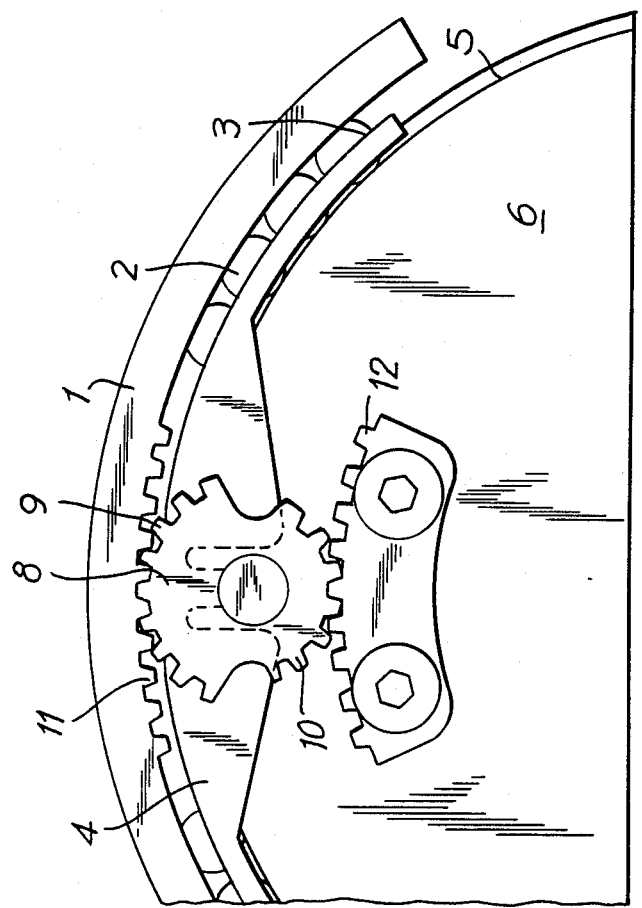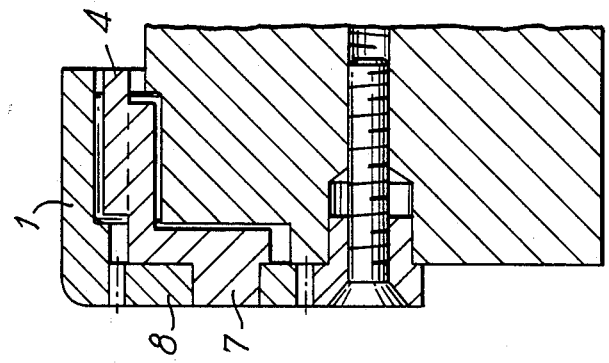

ROLLER BEARING EXECUTING SWIVEL MOTIONS WITH DEVICE FOR THE SYNCHRONOUS GUIDANCE OF THE BEARING CAGE

BACKGROUND OF THE INVENTION

1. Field of the Invention

The invention concerns a roller bearing for performing swivel motions, including a mechanism for synchronously guiding the roller bearing cage. Roller bearings of this type are used, for example, as swash plate roller bearings for hydraulic axial piston machines. Other applications are also possible.

2. Description of the Prior Art

A swash plate roller bearing for a hydraulic piston machine having rollers contained in a curved cage between the cylindrical bearing surface of the swash plate and the hollow cylindrical bearing surface of the machine housing is disclosed in DE-PS No. 16 53 617. In this disclosure, the cage is equipped with a pinion gear for the forced guidance of the cage which meshes with one toothed segment connected with the machine housing and with another toothed segment connected with the swash plate. In this known embodiment, one of the toothed segment's is solidly attached to the housing and the other is flexibly attached to the swash plate. The pitch circle diameter of the pinion gear differs from the diameter of the rollers, and the shaft of the pinion gear is offset relative to the shaft of the roller unit. The flexible mounting of the toothed segment connected with the swash plate permits a slight deviation of the cage from the precise theoretical motion—which equals half the motion of the swash plate—thereby guaranteeing a pure roller motion of the rollers in their designated races.

In DE-PS No. 16 53 617, a relatively large amount of effort is required to achieve. Indeed, in tangential recesses of the flexibly attached toothed segment, springs have been installed which push the toothed segment into a central position against projections of the swash plate.

SUMMARY AND OBJECTS OF THE INVENTION

The objective of the invention is to compensate—in a simple manner and without additional springs acting on one of the toothed segments—for any deviation in the cage movement from the roller kinetics due to deformations under load, or any deviation in tolerance due to manufacture or assembly.

This objective is met by the construction according to this invention wherein a pinion gear is flexibly and elastically connected to the cage in the direction of the cage circumference. As a result, the cage can deviate slightly from its precise theoretical motion and—notwithstanding deformations and deviations in tolerance—guarantee a pure rolling motion of the roller unit whereby both toothed segments are now solidly connected with the bearing parts, and can in fact even be incorporated in them.

According to a further feature of the invention, the flexible and elastic connection between the pinion gear and the cage can be achieved by mounting the journal for the pinion gear on a flexible crosspiece connected to the cage.

To limit the deviation of the cage, i.e., the motion of the pinion gear relative to the cage, end stops are provided, preferably on the cage.

Finally, the cage together with the journal and the end stops may be manufactured from a synthetic material through injection molding.

BRIEF DESCRIPTION OF THE DRAWINGS

Further objects and advantages of the invention will appear from the following description as well as from the accompanying drawings which illustrate an embodiment of the invention. It will be understood that the invention is not limited to the embodiment described and that the drawings are for purposes of illustration only and are not intended as a definition of the limits of the invention. Similar reference numerals refer to similar elements throughout the several views.

FIG. 1 is a longitudinal sectional view of a roller bearing executing swivel motion;

FIG. 2 is a partial top view of the roller bearing according to FIG. 1; and

DETAILED DESCRIPTION OF PREFERRED EMBODIMENTS

Figure 3:
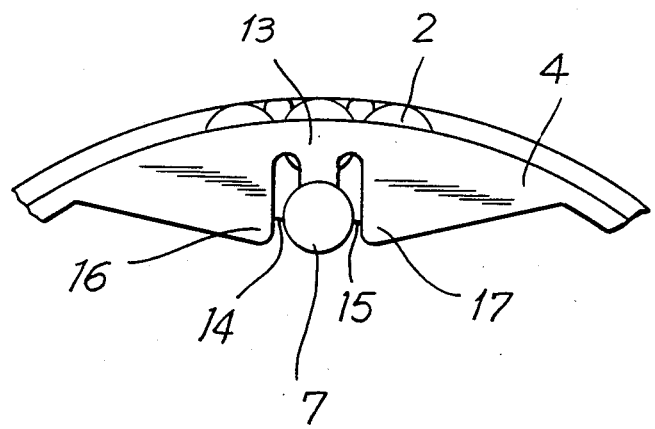
FIG. 3 is a partial top view of the cage of the roller bearing according to FIGS. 1 and 2 with the pinion gear removed.

The roller bearing shown in FIGS. 1 and 2 consists of an outer ring segment 1 and a cage 4 holding the rollers 2 in pockets 3. The rollers 2 roll on the surface area 5 of the bearing part 6 forming the inner race of, e.g., a swash plate for an axial piston pump. A journal 7 is equipped on one of the sides of the cage 4 with a rotatable pinion gear 8. Curved toothed segments 9 and 10 having different pitch circle diameters are provided on two diametrically opposite sites of the pinion gear. The toothed segments 9 and 10 mesh with toothed segments 11 and 12 of outer ring segment 1 or bearing part 6. In this embodiment, the toothed segment 11 is integrally formed with the outer ring segment 1. This is achieved, for example, by a tumbling As shown in FIG. 3, the journal 7 for the pinion gear 8 is mounted on a flexible crosspiece 13 connected to the cage 4. To limit the travel of journal 7, stops 14 and 15 are provided at a certain lateral distance from the journal on supporting wedges 16 and 17 connected to the cage.

When the outer ring segment 1 moves relative to the bearing part 6 the rollers 2 will roll in the corresponding races, thereby pushing the cage 4 from its original position. At the same time, the teeth of the toothed segments 9 and 10 of the pinion gear 8 are in rolling contact with the corresponding toothed segments 11 and 12. Any deviation in the precise rolling motion of the roller unit relative to the motion of the cage—which may be due to deformation or differences in tolerance of the various parts—are compensated by the pinion gear 8 because of its flexible and elastic mounting on the cage 4 in the direction of the circumference of the cage, until the journal 7 or the crosspiece 13 comes to rest against the stops 14 and 15. The distances between the stops 14 and 15 and the journal 7 or the crosspiece 13 can be adjusted according to the requirements of the application.

While the invention has been described in connection with preferred embodiments, this is not meant to be limiting, and it will be obvious to those skilled in the art that many changes and modifications are possible based on the principles described herein and are intended to be covered by the scope of the appended claims.

What is claimed is:

1. A roller bearing construction for performing a swivel motion including means for synchronously guiding the roller bearing cage, said construction comprising a roller bearing including a plurality of toothed parts thereof, a roller bearing cage, a journal, a rotatable pinion gear means for flexibly and elastically mounting said pinion gear to said cage in the direction of the circumference of the cage, said pinion gear having teeth which mesh with at least one set of said toothed parts on said bearing parts of said roller bearing.

2. A roller bearing according to claim 1 wherein said journal for said pinion gear is mounted on a flexible crosspiece connected to said cage.

3. A roller bearing according to claims 1 or 2 including a plurality of stops mounted with respect to said pinion gear to limit the flexible bending motion of the pinion gear relative to the cage.

4. A roller bearing according to claim 3 wherein said stops are part of the cage.

5. A roller bearing according to claim 3 wherein said cage, journal and stops are made of a synthetic material.

* * * * *

UNITED STATES PATENT AND TRADEMARK OFFICE
CERTIFICATE OF CORRECTION

PATENT NO. : 4,884,902

DATED : December 5, 1989

INVENTOR(S) : Klaus Kispert and Robert Stolz

It is certified that error appears in the above-identified patent and that said Letters Patent is hereby corrected as shown below:

Column 1, line 39, after "achieve" insert --this pure rolling motion--.

Column 2, line 42, after "tumbling" insert --forgoing process or by a similar forming process--.

Signed and Sealed this

Ninth Day of February, 1993

*Attest:*

STEPHEN G. KUNIN

*Attesting Officer*     *Acting Commissioner of Patents and Trademarks*